United States Patent
Okamoto

(10) Patent No.: US 8,903,255 B2
(45) Date of Patent: Dec. 2, 2014

(54) POLARIZATION-MULTIPLEXED SIGNAL RECEIVER, POLARIZATION MULTIPLEXING SYSTEM AND POLARIZATION-MULTIPLEXED SIGNAL RECEIVING METHOD

(75) Inventor: Takeshi Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 156 days.

(21) Appl. No.: 13/564,331

(22) Filed: Aug. 1, 2012

(65) Prior Publication Data

US 2013/0034354 A1 Feb. 7, 2013

(30) Foreign Application Priority Data

Aug. 1, 2011 (JP) .................................. 2011-168398

(51) Int. Cl.
*H04B 10/06* (2006.01)

(52) U.S. Cl.
USPC ............................. 398/206; 398/202; 398/209

(58) Field of Classification Search
None
See application file for complete search history.

(56) References Cited

U.S. PATENT DOCUMENTS

| 2010/0178065 A1* | 7/2010 | Nishihara et al. ............. 398/202 |
| 2010/0189438 A1* | 7/2010 | Hoshida .......................... 398/65 |
| 2010/0260504 A1 | 10/2010 | Takahara |
| 2011/0142449 A1* | 6/2011 | Xie ................................. 398/65 |

FOREIGN PATENT DOCUMENTS

| JP | 2010178091 A | 8/2010 |
| JP | 2010251851 A | 11/2010 |

* cited by examiner

*Primary Examiner* — Ken Vanderpuye
*Assistant Examiner* — Merlin Brito Peguero
(74) *Attorney, Agent, or Firm* — Sughrue Mion, PLLC

(57) ABSTRACT

A polarization-multiplexed signal receiver includes a polarization adjustment unit to adjust a polarization state of inputted polarization-multiplexed signal, which is carrying signal data on each of two polarized waves being inputted, based on a control signal and to output the adjusted polarization-multiplexed signal, an optical signal reception unit to convert the polarization-multiplexed signal having the adjusted polarization state into an analog electric signal and output the analog electric signal,
an A/D conversion unit to convert the analog electric signal into a digital electric signal and output the digital electric signal, a digital signal processing unit to perform digital coherent processing to the digital electric signal and take out the signal data and a feedback control unit to generate the control signal based on quality of the signal data and output the signal data to the polarization adjustment unit.

10 Claims, 4 Drawing Sheets

POLARIZATION MULTIPLEXING SYSTEM 100B

POLARIZATION-MULTIPLEXED SIGNAL RECEIVER, POLARIZATION MULTIPLEXING SYSTEM AND POLARIZATION-MULTIPLEXED SIGNAL RECEIVING METHOD

INCORPORATION BY REFERENCE

This application is based upon and claims the benefit of priority from Japanese Patent Application No. JP 2011-168398, filed on Aug. 1, 2011, the disclosure of which is incorporated herein in its entirety by reference.

BACKGROUND OF THE INVENTION

1. Technical Field

The present invention relates to a polarization-multiplexed signal receiver, a polarization multiplexing system and a polarization-multiplexed signal receiving method using polarization-multiplexed signal, and, more particularly, to a polarization-multiplexed signal receiver, a polarization multiplexing system and a polarization-multiplexed signal receiving method which compensate for imperfection of receiving condition.

2. Background Art

In order to realize a superspeed optical transmission system beyond 40 Gb/s, a polarization multiplexing technology is being adopted. In the polarization multiplexing technology, two pieces of independent signal information are transmitted by utilizing two polarization states on an identical wavelength orthogonal to each other. By adopting the polarization multiplexing technology, a transmission bit rate can be made double while maintaining a symbol rate, that is, while maintaining a modulation frequency. A technology about a transmission system using the polarization multiplexing technology is disclosed in patent document 1 (Japanese Patent Application Laid-Open No. 2010-251851), for example.

However, when polarization-multiplexed signal carrying two pieces of independent signal information in each of two orthogonal polarized waves is received and the two pieces of signal information are taken out from the polarization-multiplexed signal, a quality of the signal information declines due to degrading of orthogonal nature of the two polarized waves.

Accordingly, in patent document 2 (Japanese Patent Application Laid-Open No. 2010-178091), there is disclosed polarization-multiplexed signal receiver which includes a polarization controller which controls a polarization state of received polarization-multiplexed signal in the foremost stage and performs feedback control of the polarization controller so that a total bit error ratio of X polarization channel signal and Y polarization channel signal made by applying polarization separation may become the smallest.

SUMMARY

An object of the present invention is to provide a polarization-multiplexed signal receiver, a polarization multiplexing system and a polarization-multiplexed signal receiving method of high reliability which can realize good transmission characteristics by compensating for imperfection of receiving condition with a high degree of accuracy.

A polarization-multiplexed signal receiver according to an exemplary aspect of the invention includes a polarization adjustment unit to adjust a polarization state of inputted polarization-multiplexed signal, which is carrying signal data on each of two polarized waves being inputted, based on a control signal and to output the adjusted polarization-multiplexed signal, an optical signal reception unit to convert the polarization-multiplexed signal having the adjusted polarization state into an analog electric signal and output the analog electric signal, an A/D conversion unit to convert the analog electric signal into a digital electric signal and output the digital electric signal, a digital signal processing unit to perform digital coherent processing to the digital electric signal and take out the signal data and a feedback control unit to generate the control signal based on quality of the signal data and output the signal data to the polarization adjustment unit.

A polarization multiplexing system according to an exemplary aspect of the invention includes a polarization-multiplexed signal transmitter including a first optical transmission unit to output an optical signal modulated based on a first signal data, a second optical transmission unit to output an optical signal modulated based on a second signal data, and a polarization multiplexing unit to synthesize the optical signal outputted by the first optical transmission unit and the optical signal outputted by the second optical transmission unit in an orthogonal polarization state and transmit as a polarization-multiplexed signal, an optical transmission path to transmit the polarization-multiplexed signal while holding the polarization state and an above mentioned polarization-multiplexed signal receiver to receive the polarization-multiplexed signal from the polarization-multiplexed signal transmitter via the optical transmission path.

A polarization-multiplexed signal receiving method according to an exemplary aspect of the invention includes adjusting a polarization state of a polarization-multiplexed signal carrying signal data on each of two polarized waves based on a control signal and outputting the adjusted polarization-multiplexed signal, converting the polarization-multiplexed signal having an adjusted polarization state into an analog electric signal and outputting the analog electric signal, converting the analog electric signal into a digital electric signal and outputting the digital electric signal, performing digital coherent processing to the digital electric signal and taking out the signal data and generating the control signal based on quality of the signal data to perform feedback control.

A polarization-multiplexed signal receiver according to an another exemplary aspect of the invention includes a polarization adjustment means for adjusting a polarization state of inputted polarization-multiplexed signal, which is carrying signal data on each of two polarized waves being inputted, based on a control signal and to output the adjusted polarization-multiplexed signal, an optical signal reception means for converting the polarization-multiplexed signal having the adjusted polarization state into an analog electric signal and output the analog electric signal, an A/D conversion means for converting the analog electric signal into a digital electric signal and outputting the digital electric signal, a digital signal processing means for performing digital coherent processing to the digital electric signal and taking out the signal data and a feedback control means for generating the control signal based on quality of the signal data and outputting the signal data to the polarization adjustment unit.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

The First Exemplary Embodiment

Figure 1:
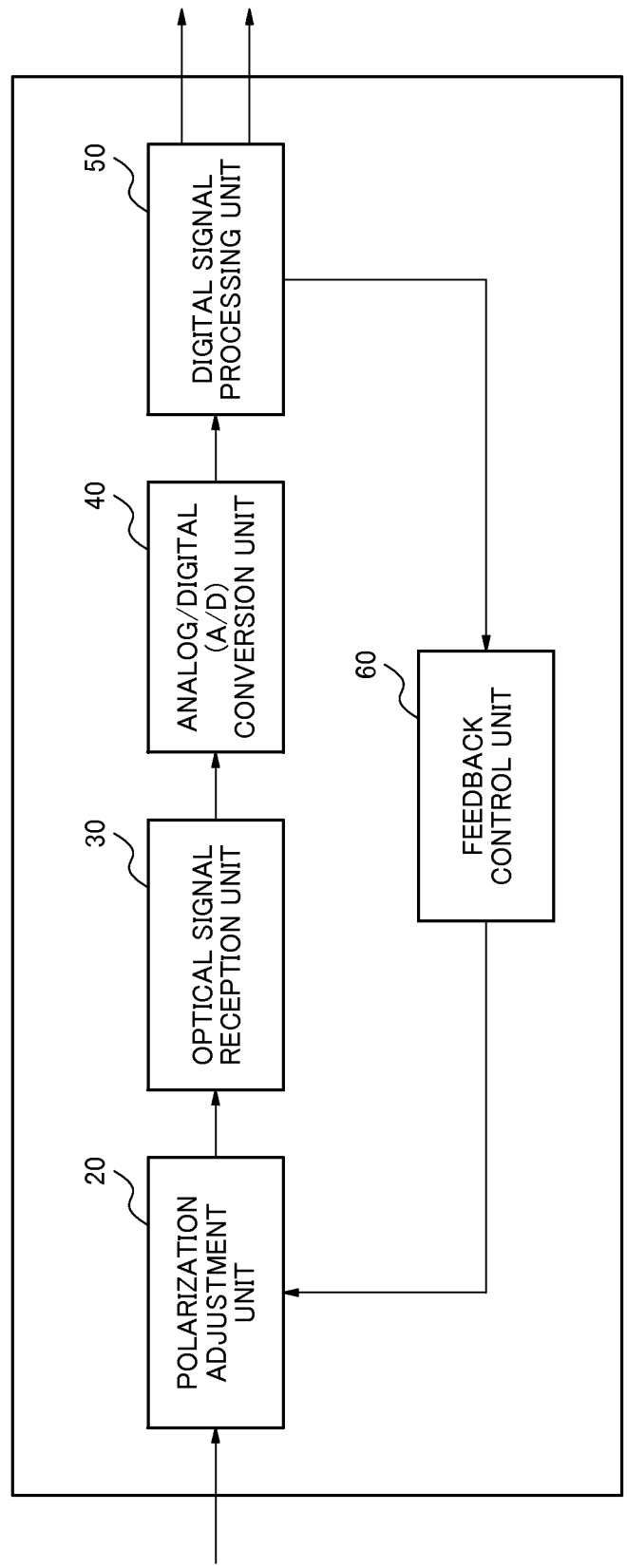
FIG. 1 is an example of a block diagram of a polarization-multiplexed signal receiver 10 according to a first exemplary embodiment of the present invention.

A polarization-multiplexed signal receiver according to the first exemplary embodiment of the present invention will be described. An example of a block diagram of the polarization-multiplexed signal receiver according to this exemplary embodiment is shown in FIG. 1. In FIG. 1, the polarization-multiplexed signal receiver 10 includes a polarization adjustment unit 20, an optical signal reception unit 30, an analog/digital (A/D) conversion unit 40, a digital signal processing unit 50 and a feedback control unit 60.

When a polarization-multiplexed signal including signal data carried by each of two polarized waves is inputted, the polarization adjustment unit 20 adjusts a polarization state of the polarization-multiplexed signal based on a control signal and outputs the signal to the optical signal reception unit 30. The polarization adjustment unit 20 includes a λ/2-wavelength plate and a λ/4-wavelength plate, for example.

The optical signal reception unit 30 converts the polarization-multiplexed signal having said adjusted polarization state into an analog electric signal and outputs it to the A/D conversion unit 40. In this exemplary embodiment, the optical signal reception unit 30 optically separates the polarization-multiplexed signal into an X polarization optical signal and a Y polarization optical signal and converts the X polarization optical signal and the Y polarization optical signal into analog electric signals, respectively. Meanwhile, it is also possible to arrange a local oscillator (LO: Local Oscillator) light source and an optical branching filter in the optical signal reception unit 30, and to perform conversion into an electric signal by causing interference between the polarization-multiplexed signal having said adjusted polarization states and the LO light by using an optical branching filter.

The A/D conversion unit 40 converts the analog electric signals inputted from the optical signal reception unit 30 into digital electric signals and then outputs the digital signals to the digital signal processing unit 50.

The digital signal processing unit 50 carries out digital coherent processing of the digital electric signals inputted from the A/D conversion unit 40, and takes out signal data included in the two polarized waves. The digital signal processing unit 50 outputs the signal data to the feedback control unit 60.

Specifically, first, the digital signal processing unit 50 according to this exemplary embodiment performs compensation for the digital electric signals such as fixed/adaptive dispersion compensation, polarization multiplexing separation/polarization dispersion compensation, clock extraction, phase noise removal and symbol identification. Further, the digital signal processing unit 50 applies a constant modulus algorithm (CMA) to the digital electric signals to which various kinds of compensation has been applied to perform polarization separation of the digital electric signals, and takes out signal data.

CMA is an algorithm for correctly separating signals for which polarization multiplexing has been performed without being commingled, and, for example, it makes an amplitude absolute value of an output signal close to a designated reference value by adjusting a filter factor. Because CMA does not need to know information to be transmitted, it is also called blind processing.

The feedback control unit 60 performs feedback control of the polarization adjustment unit 20 based on a quality of the signal data by applying CMA. The feedback control unit 60 according to this exemplary embodiment monitors a bit error of the signal data inputted from the digital signal processing unit 50, and generates a control signal so that a count value of bit errors becomes smallest and transmits the control signal to the polarization adjustment unit 20.

Meanwhile, it is also possible that the feedback control unit 60 monitors a Q value of the signal data by applying CMA, and performs feedback control of the polarization adjustment unit 20 so that a Q value may become biggest.

The polarization-multiplexed signal receiver 10 configured as above takes out signal data by applying digital coherent processing to digital electric signal converted from polarization-multiplexed signal, and performs feedback control of the polarization adjustment unit 20 based on the quality of the signal data. By performing feedback control of the polarization adjustment unit 20 using the quality of the signal data after digital coherent processing, it is possible to compensate for imperfection of receiving condition with a higher degree of accuracy and realize good transmission characteristics.

Here, CMA is an algorithm on the premise that a transmission signal has a certain amplitude absolute value. When uncertain time fluctuation and the like due to a bend, double refraction, vibration or the like of a transmission line occurs, an operation of CMA becomes unstable, and thus quality of outputted signal data cannot be maintained any more. This appears particularly remarkably when a polarization dependent loss (PDL: Polarization Dependent Loss) and imperfection of analog characteristics (Skew and a variation of amplitude) which cannot be sufficiently handled by digital processing exists in a system. When quality of signal data cannot be maintained, necessity to arrange a high-performance error correction circuit or the like in a latter stage of a digital signal processing circuit in order to compensate for this arises, and cost becomes high.

In contrast, when the polarization adjustment unit 20 is provided in a former stage of the polarization-multiplexed signal receiver 10, and feedback control of this polarization adjustment unit 20 is performed based on signal data demodulated correctly by applying CMA, two transmission signals having orthogonal polarized waves can be kept within a fixed amplitude absolute value. Because amplitude absolute values of two transmission signals are kept fixedly, an operation of CMA becomes stable, and the polarization-multiplexed signal receiver 10 according to this exemplary embodiment can perform more highly accurate digital coherent processing. In addition, because a correction circuit or the like does not need to be arranged, increase of cost can be suppressed.

The Second Exemplary Embodiment

The second exemplary embodiment will be described. An example of a block diagram of a polarization multiplexing system according to this exemplary embodiment is shown in FIG. 2.

Figure 2:
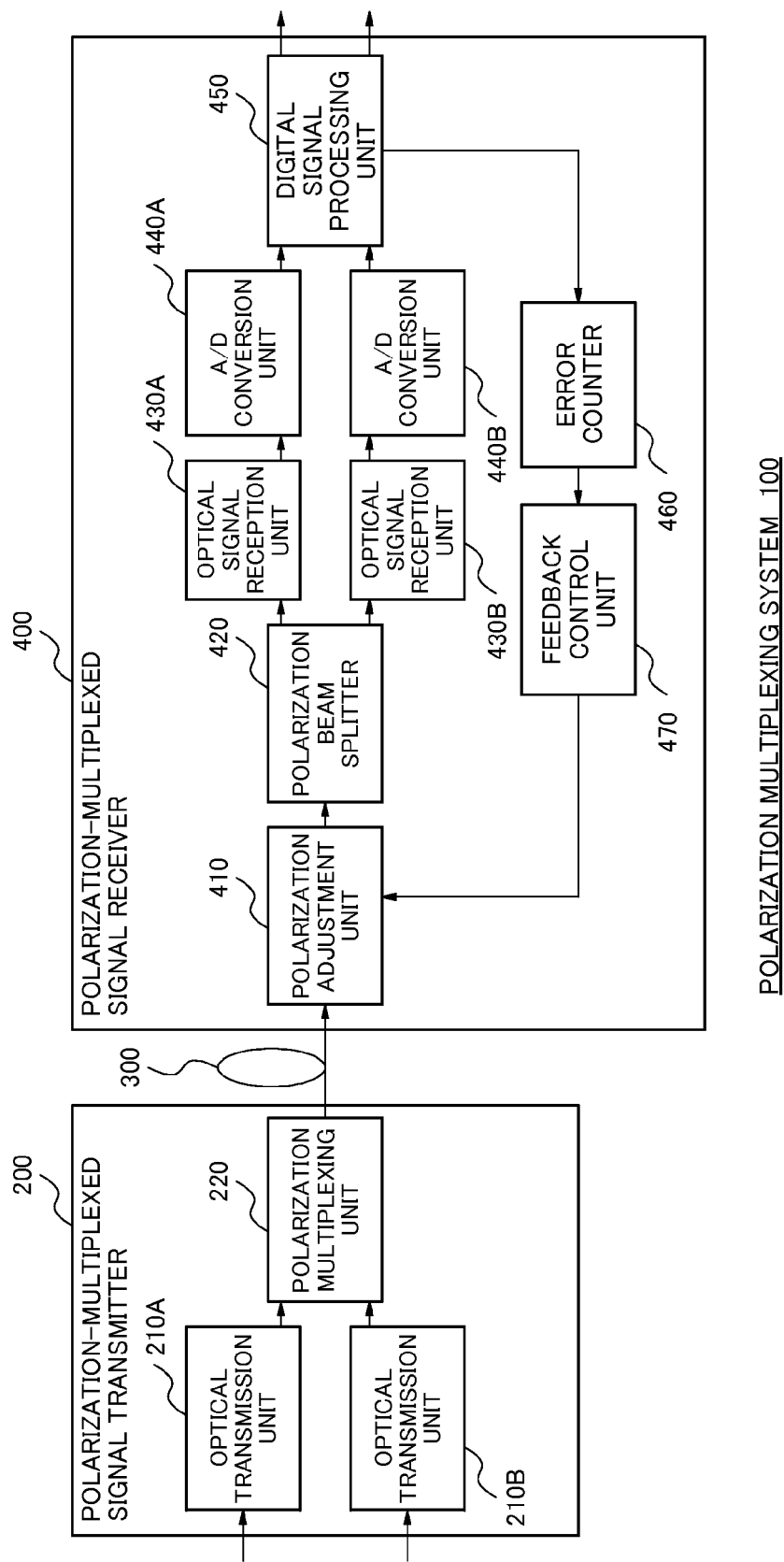
FIG. 2 is an example of a block diagram of a polarization multiplexing system 100 according to a second exemplary embodiment of the present invention.

In FIG. 2, the polarization multiplexing system 100 according to this exemplary embodiment includes a polarization-multiplexed signal transmitter 200, an optical transmission path 300 and a polarization-multiplexed signal receiver 400.

The polarization-multiplexed signal transmitter 200 includes two optical transmission units 210A and 210B and a polarization multiplexing unit 220. To the optical transmission units 210A and 210B, data signals are inputted, respectively. According to inputted data signals, the optical transmission units 210A and 210B add an optical carrier into the data signal to modulate, and output the modulated data signals, respectively. Here, as a modulation method, any one of intensity modulation which changes intensity of light, phase modulation which changes phase of light and frequency modulation which changes frequency of light, or a combination of those can be adopted. The modulated data signals may be signals generated by separating one piece of data into two, or may be completely different signals having no relation with each other.

The polarization multiplexing unit 220 synthesizes modulated signals outputted from the optical transmission units 210A and 210B in a polarization state so as to generate a polarization-multiplexed signal. The polarization multiplexing unit 220 and each of the optical transmission units 210A and 210B are connected using a polarization maintaining (PANDA: Polarization-maintaining AND Absorption-reducing) optical fiber, for example.

The optical transmission path 300 transmits the polarization-multiplexed signal outputted from the polarization-multiplexed signal transmitter 200 and outputs it to the polarization-multiplexed signal receiver 400. A single mode fiber can be applied to the optical transmission path 300, for example.

The polarization-multiplexed signal receiver 400 includes a polarization adjustment unit 410, a polarization beam splitter 420, two optical signals reception units 430A and 430B, two A/D conversion units 440A and 440B, a digital signal processing unit 450, an error counter 460 and a feedback control unit 470.

When polarization-multiplexed signal is received from the polarization-multiplexed signal transmitter 200 via the optical transmission path 300, the polarization adjustment unit 410 adjusts a polarization state of the received polarization-multiplexed signal based on a control signal inputted from the feedback control unit 470 and outputs the adjusted signal to the polarization beam splitter 420. The polarization adjustment unit 410 can be configured by a $\lambda/2$ wavelength plate and a $\lambda/4$ wavelength plate, for example.

The polarization beam splitter 420 optically separates the polarization-multiplexed signal having the adjusted polarization state into a X polarization optical signal and a Y polarization optical signal optically. Then, the polarization beam splitter 420 outputs the X polarization optical signal and the Y polarization optical signal to the optical signal reception units 430A and 430B, respectively.

The optical signals reception units 430A and 430B convert the X polarization optical signal and the Y polarization optical signal into analog electric signals, respectively, and outputs those to the A/D conversion units 440A and 440B. The most basic components of the optical signals reception units 430A and 430B are a light receiver (PD: Photodiode) and a transimpedance amplifier (TIA: Transimpedance Amplifier). If coherent reception is included in a combination, a local oscillator (LO) light source and an optical branching filter and the like are added as a component.

The A/D conversion units 440A and 440B quantize analog electric signals inputted from the optical signals reception units 430A and 430B, respectively, and converts them into digital electric signals and outputs the converted signals to the digital signal processing unit 450. Although the larger a quantifying bit number is, the more precisely information can be held, the circuit scale becomes large when the quantifying bit number becomes large. Accordingly, taking an allowed circuit scale into consideration, a quantifying bit number of about 6-8 bits is desired.

The digital signal processing unit 450 performs digital coherent processing to digital electric signals inputted from the A/D conversion units 440A and 440B. In this exemplary embodiment, the digital signal processing unit 450 compensates digital electric signals for a shift such as distortion by removing a phase noise in the electric area, and performs polarization separation of digital electric signals into an X polarization component and a Y polarization component by applying CMA. Further, the digital signal processing unit 450 performs bit processing of the X polarization component and the Y polarization component to which polarization separation has been performed by applying CMA and outputs them as data signals.

Here, a formula for updating an adaptive equalizing filter tap coefficient when using CMA is indicated in Formula (1).

$$w(n+1)=w(n)-\mu r(n)(|y\_n|^2-\gamma)y\_n \qquad \text{Formula (1)}$$

where, w (n) and w (n+1) are adaptive equalizing filter tap coefficients at clock time n and n+1. The sign $\mu$ is called a step size parameter, and adjusts a convergence speed of calculation. The sign y (n) is a received signal, y_n is a filter output signal and $\gamma$ is a constant.

When polarization-multiplexed signals carrying independent data signals on each of an X polarization component and a Y polarization component are separated into an X polarization optical signal and a Y polarization optical signal optically, due to double refraction or the like remaining in an optical transmission path, two polarization multiplexed data signals are mixed in each separated optical signal. When data signals are mixed, phase differences between the polarization components are modulated at random, and, in the optical signal separated optically, time fluctuation appears in filter output signal y_n.

By bringing y_n close to a constant value $\gamma$ about a signal separated into an X polarization optical signal and a Y polarization optical signal optically, respectively, the CMA control algorithm according to this exemplary embodiment controls the filter tap coefficient w (n+1) so that intensity of filter output signals of the X polarization component and the Y polarization component may approach a constant value stably. As it may be understood from Formula (1), CMA is blind processing which does not require training symbols besides signal information, and thus information can be transmitted efficiently. In the CMA control algorithm according to this exemplary embodiment, convergence is possible even when an original value of the filter tap coefficient is away from an optimum value, and, in addition, circuit implementation can be done relatively simply.

On the other hand, bit processing for an X polarization component and a Y polarization component in the state that the above-mentioned CMA control algorithm is being applied can be realized by making FIR (Finite-Impulse Response) filters be crisscrossed for the X polarization component and the Y polarization component. FIR filter is constituted such that the tap coefficient of the N stage can be set with a delay time T that is aligned with the symbol interval or the sample interval. Here, the number of stages N is decided from a trade-off of convergence accuracy and a circuit scale of the algorithm, and often decided to be about 5-15. By arranging a filter factor application control circuit for controlling a tap coefficient, and taking in input/output signals of CMA into the filter factor application control circuit, the tap coefficient based on the above-mentioned CMA control algorithm is determined.

Now, description will return to FIG. 2. The error counter 460 monitors data signals that are outputted from the digital signal processing unit 450 after undergoing bit processing. When a bit error is detected in the data signals, the error counter 460 outputs it to the feedback control unit 470. In this exemplary embodiment, the error counter 460 detects a bit error by converting data signals outputted from the digital signal processing unit 450 into binary data using a decoder, and comparing the binary data with transmission expected value data.

The feedback control unit 470 counts bit errors inputted from the error counter 460, and generates a control signal by which a count value becomes smallest and outputs the control signal to the polarization adjustment unit 410.

As above, in the polarization multiplexing system 100 according to this exemplary embodiment, the polarization-multiplexed signal receiver 400 performs feedback control of the polarization adjustment unit 410 based on a quality of data signals after performing polarization multiplexing separation by applying CMA. By applying CMA, polarization separation is performed ideally without mixing of two original data signals at the time of transmission, and thus correct data signals are demodulated. Then, by performing feedback control of the polarization adjustment unit 410 using signal data demodulated correctly, it is possible to compensate for imperfection of receiving condition with a higher degree of accuracy and realize good transmission characteristics.

Meanwhile, in the above, although a bit error is counted and a control signal is generated so that a count value may become smallest, the present invention is not limited to this. For example, a Q value monitor or the like which calculates Q value of a signal outputted from the digital signal processing unit 450 can be provided in place of the error counter 460. In this case, the feedback control unit 470 generates a control signal so that a Q value outputted from the Q value monitor may become biggest, and outputs it to the polarization adjustment unit 410.

The Third Exemplary Embodiment

Figure 3:
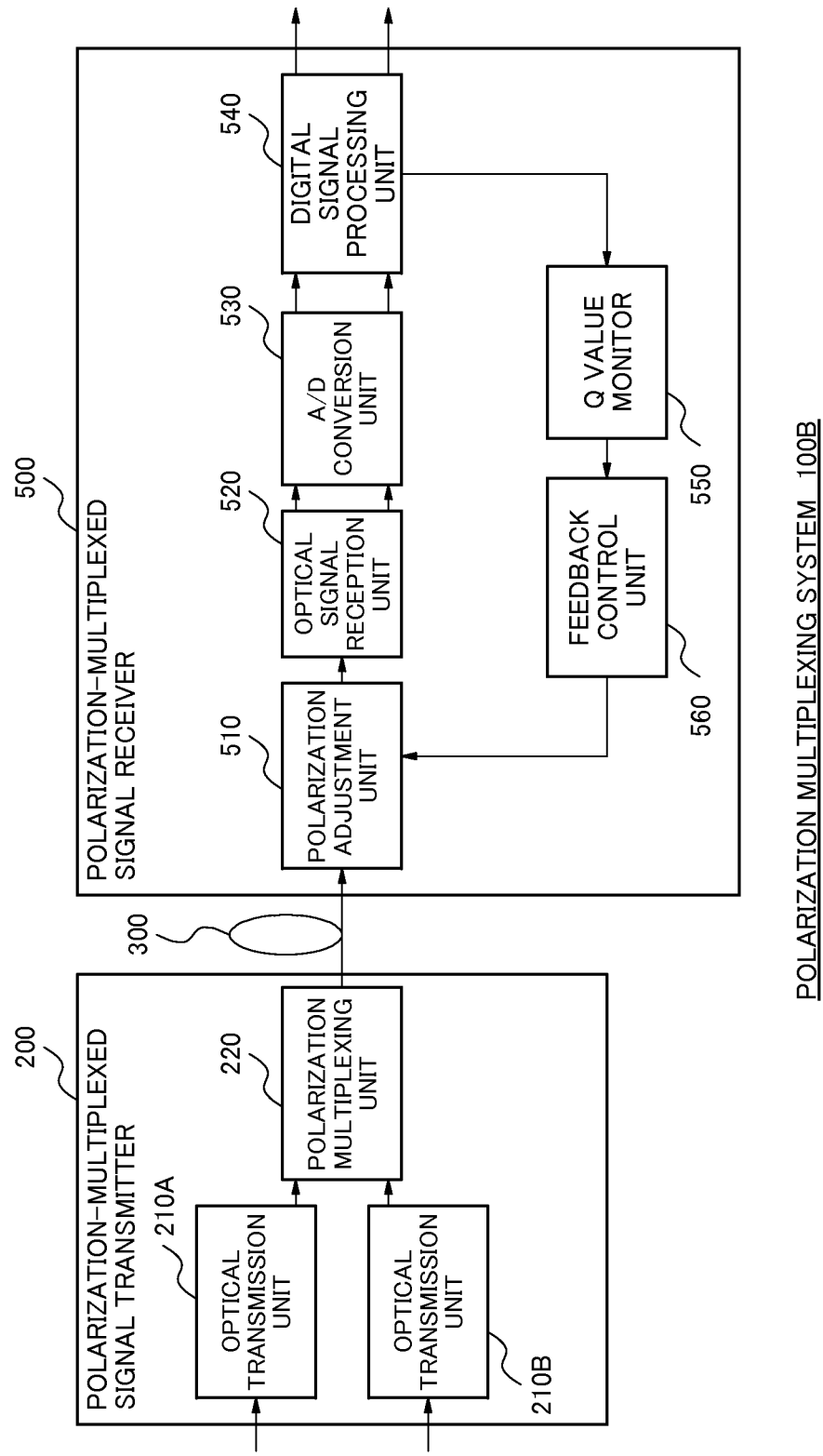
FIG. 3 is an example of a block diagram of a polarization multiplexing system 100B according to a third exemplary embodiment of the present invention.

The third exemplary embodiment will be described. An example of a block diagram of a polarization multiplexing system according to this exemplary embodiment is shown in FIG. 3. In FIG. 3, the polarization multiplexing system 100B according to this exemplary embodiment includes a polarization-multiplexed signal transmitter 200, an optical transmission path 300 and a polarization-multiplexed signal receiver 500. The polarization-multiplexed signal transmitter 200 and the optical transmission path 300 are similar to those of the second exemplary embodiment, and detailed description will be omitted.

The polarization-multiplexed signal receiver 500 includes a polarization adjustment unit 510, an optical signal reception unit 520, an A/D conversion unit 530, a digital signal processing unit 540, a Q value monitor 550 and a feedback control unit 560.

When a polarization-multiplexed signal is received from the polarization-multiplexed signal transmitter 200 via the optical transmission path 300, the polarization adjustment unit 510 adjusts the polarization state of the polarization-multiplexed signal based on a control signal inputted from the feedback control unit 560 and outputs it to the optical signal reception unit 520. The polarization adjustment unit 510 can be composed by a λ/2 wavelength plate and a λ/4 wavelength plate, for example.

Figure 4:
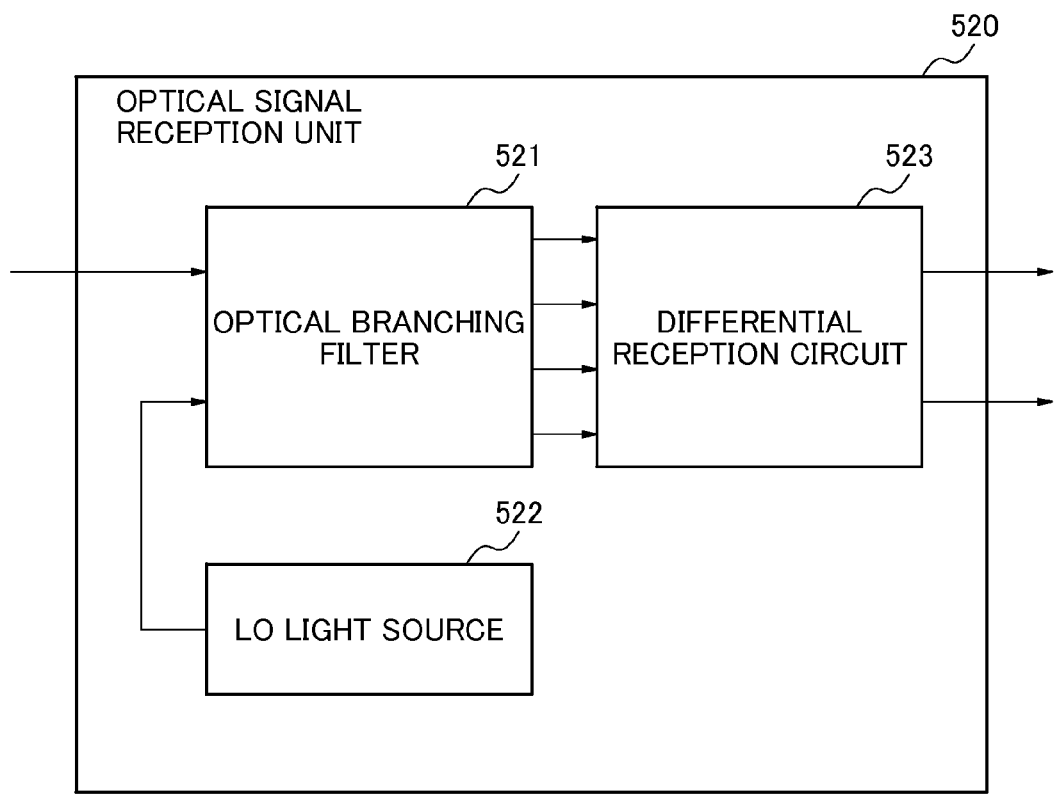
FIG. 4 is an example of a block diagram of an optical signal reception unit 520 according to the third exemplary embodiment of the present invention.

The optical signal reception unit 520 converts the polarization-multiplexed signal inputted from the polarization adjustment unit 510 having the polarization state into an electric signal by making it interfere with LO light, and outputs the electric signal to the A/D conversion unit 530. An example of a block diagram of the optical signal reception unit 520 according to this exemplary embodiment is shown in FIG. 4. In FIG. 4, the optical signal reception unit 520 includes an optical branching filter 521, an LO light source 522 and a differential reception circuit 523.

The polarization-multiplexed signal having the adjusted polarization state and LO having a wavelength almost the same as that of the polarization-multiplexed signal are inputted to the optical branching filter 521. The optical branching filter 521 is an optical 90-degree hybrid circuit or the like, and makes the polarization-multiplexed signal and LO light interfere with each other in the common mode and in the reversed phase and outputs the resulting waves to the differential reception circuit 523.

After performing differential photoelectric conversion detection of the output from the optical branching filter 521 using two balance type PDs, for example, the differential reception circuit 523 amplifies obtained electric signals by TIA and outputs them to the A/D conversion unit 530 as electric signals of a common mode interference component and an orthogonal interference component between the polarization-multiplexed signal and the LO light.

Description will be returned to FIG. 3. The A/D conversion unit 530 quantizes analog electric signals of a common mode interference component and a orthogonal interference component of polarization-multiplexed signals inputted from the optical signal reception unit 520, and analog electric signals of a common mode interference component and an orthogonal interference component of the LO light, and converts them into digital electric signals and outputs them to the digital signal processing unit 540.

The digital signal processing unit 540 has the same function as that of the digital signal processing unit 450 that has been described in the second exemplary embodiment. That is, the digital signal processing unit 540 compensates the digital electric signals inputted from the A/D conversion unit 530 for distortion and the like, and performs polarization separation into an X polarization component and a Y polarization component by applying CMA. Further, the digital signal processing unit 540 performs bit processing of the X polarization component and the Y polarization component to which polarization separation has been performed and outputs these to the Q value monitor 550 as data signals.

The Q value monitor 550 monitors quality of the data signals inputted from the digital signal processing unit 540. The Q value monitor 550 calculates the Q value of the inputted data signals and outputs the calculated Q value to the feedback control unit 560.

The feedback control unit 560 generates a control signal and outputs it to the polarization adjustment unit 510 so that a Q value inputted from the Q value monitor 550 may become biggest. Because the Q value monitor 550 calculates a Q value by statistical calculation, its structure can be made simpler.

As above, in the polarization multiplexing system 100B according to this exemplary embodiment, the polarization-multiplexed signal receiver 500 performs digital coherent reception. In this case, an X polarization component and a Y polarization component can be separated more ideally, and accurate feedback control can be performed to the polarization adjustment unit 510. Because the Q value monitor 550 calculates a Q value by statistical calculation, its structure can be made simpler compared with a case where a bit error is counted, for example.

Meanwhile, as is the case with the second exemplary embodiment, it is possible to perform feedback control of the polarization adjustment unit 510 by providing an error counter instead of the Q value monitor 550 and by the feedback control unit 560 generating a control signal with which a count value of bit errors that is inputted from the error counter becomes smallest.

The polarization-multiplexed signal receiver 10, the polarization multiplexing system 100 and 100B according to the above-mentioned exemplary embodiments can be applied to a system or the like using an intermediate and long distance light source for wavelength multiplexing communication used in a trunk line system and an access system.

Although the present invention has been described with reference to each of the above-mentioned exemplary embodiments above, the present invention is not limited to each of the above-mentioned exemplary embodiments. It is possible to make various modifications to the composition and details of the present invention within a range that does not depart from the points of the present invention. Also, the present invention includes ones made by appropriately combining part or all of the structure of each of the above-mentioned exemplary embodiments mutually.

Here, in patent document 2 indicated in BACKGROUND ART, a polarization-multiplexed signal receiver performs feedback control of a polarization controller using a total bit error ratio of an X polarization channel signal and a Y polarization channel signal to which polarization separation has been performed optically.

However, in the X polarization channel signal and the Y polarization channel signal to which polarization separation has been performed optically, two pieces of polarization multiplexed signal information due to double refraction or the like remaining in an optical transmission path exist in a mixed manner. When feedback control of a polarization controller is performed using a polarization channel signal in which pieces of signal information are being mixed, it is difficult to assure quality of taken out signal information sufficiently.

In contrast, a polarization-multiplexed signal receiver according to the present invention takes out signal data by applying digital coherent processing to a digital electric signal made by converting polarization-multiplexed signal, and perform feedback control of a polarization adjustment unit based on the signal data.

By performing feedback control of a polarization adjustment unit using signal data demodulated correctly without being mixed by performing digital coherent processing, it is possible to realize good transmission characteristics by compensating for imperfection of receiving condition with a higher degree of accuracy.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A polarization-multiplexed signal receiver, comprising:
a polarization adjustment unit to adjust a polarization state of inputted polarization-multiplexed signal, which is carrying signal data on each of two polarized waves being inputted, based on a control signal and to output said adjusted polarization-multiplexed signal;
an optical signal reception unit to convert said polarization-multiplexed signal having said adjusted polarization state into an analog electric signal and output said analog electric signal;
an A/D conversion unit to convert said analog electric signal into a digital electric signal and output said digital electric signal;
a digital signal processing unit to perform digital coherent processing to said digital electric signal and take out said signal data; and
a feedback control unit to generate said control signal based on quality of said signal data taken out by said digital signal processing unit and output said signal data taken out by said digital signal processing unit to said polarization adjustment unit, wherein said digital signal processing unit performs polarization separation of said digital electric signal by applying CMA (Constant Modulus Algorithm) and takes out said signal data, and the polarization adjustment unit is feedback-controlled based on a quality of the signal data taken out by said digital signal processing unit with which CMA was applied.

2. The polarization-multiplexed signal receiver according to claim 1, wherein
said digital signal processing unit takes out said signal data taken out by said digital signal processing unit after removing a phase noise from said digital electric signal.

3. The polarization-multiplexed signal receiver according to claim 1, wherein
said polarization adjustment unit includes a λ/2 wavelength plate and a λ/4 wavelength plate, and adjusts said λ/2 wavelength plate and said λ/4 wavelength plate based on said control signal.

4. The polarization-multiplexed signal receiver according to claim 1, further comprising:
an error counter to count bit errors of said signal data and output a count value of said bit errors, wherein
said feedback control unit generates a control signal so that said count value of bit errors becomes smallest.

5. The polarization-multiplexed signal receiver according to claim 1, further comprising:
a Q value monitor to calculate a Q value of said signal data taken out by said digital signal processing unit and output said Q value, wherein
said feedback control unit generates a control signal so that said Q value becomes biggest.

6. The polarization-multiplexed signal receiver according to claim 1, further including:
a polarization separation unit to optically separate said polarization-multiplexed signal having said adjusted polarization state into an X polarization optical signal and a Y polarization optical signal, wherein
said optical signal reception unit converts said X polarization optical signal and Y polarization optical signal into analog electric signals, respectively, and outputs said analog electric signals;
said A/D conversion unit converts said outputted analog electric signals into digital electric signals, respectively, and outputs said digital electric signals.

7. The polarization-multiplexed signal receiver according to claim 1, wherein said optical signals reception unit includes:
- a LO (Local Oscillator) light source to output LO light having a wavelength approximately identical with said polarization-multiplexed signal;
- an optical branching filter to cause interference between said polarization-multiplexed signal having said adjusted polarization state and said LO light, and output interference light; and
- a differential reception circuit to perform differential reception of said interference light and output electric signal of a common mode interference component and an orthogonal interference component.

8. A polarization multiplexing system comprising:
- a polarization-multiplexed signal transmitter including a first optical transmission unit to output an optical signal modulated based on a first signal data, a second optical transmission unit to output an optical signal modulated based on a second signal data, and a polarization multiplexing unit to synthesize said optical signal outputted by said first optical transmission unit and said optical signal outputted by said second optical transmission unit in an orthogonal polarization state and transmit as a polarization-multiplexed signal;
- an optical transmission path to transmit said polarization-multiplexed signal while holding said polarization state; and
- a polarization-multiplexed signal receiver according to claim 1 to receive said polarization-multiplexed signal from said polarization-multiplexed signal transmitter via said optical transmission path.

9. A polarization-multiplexed signal receiving method, comprising:
- adjusting a polarization state of a polarization-multiplexed signal carrying signal data on each of two polarized waves based on a control signal and outputting said adjusted polarization-multiplexed signal;
- converting said polarization-multiplexed signal having an adjusted polarization state into an analog electric signal and outputting said analog electric signal;
- converting said analog electric signal into a digital electric signal and outputting said digital electric signal;
- performing digital coherent processing to said digital electric signal and taking out said signal data; and
- generating said control signal based on quality of said signal data to perform feedback control, wherein performing digital coherent processing comprises performing polarization separation of said digital electric signal by applying CMA (Constant Modulus Algorithm) and taking out said signal data, and the polarization adjustment is feedback-controlled based on a quality of the signal data with which CMA was applied.

10. A polarization-multiplexed signal receiver, comprising:
- a polarization adjustment means for adjusting a polarization state of inputted polarization-multiplexed signal, which is carrying signal data on each of two polarized waves being inputted, based on a control signal and to output said adjusted polarization-multiplexed signal;
- an optical signal reception means for converting said polarization-multiplexed signal having said adjusted polarization state into an analog electric signal and output said analog electric signal;
- an A/D conversion means for converting said analog electric signal into a digital electric signal and outputting said digital electric signal;
- a digital signal processing means for performing digital coherent processing to said digital electric signal and taking out said signal data; and
- a feedback control means for generating said control signal based on quality of said signal data taken out by said digital signal processing unit and outputting said signal data taken out by said digital signal processing means to said polarization adjustment unit, wherein
- said digital signal processing means performs polarization separation of said digital electric signal by applying CMA (Constant Modulus Algorithm) and takes out said signal data, and the polarization adjustment means is feedback-controlled based on a quality of the signal data taken out by said digital signal processing means, with which CMA was applied.

* * * * *